US011687795B2

(12) United States Patent
Ferreira Moreno et al.

(10) Patent No.: US 11,687,795 B2
(45) Date of Patent: Jun. 27, 2023

(54) MACHINE LEARNING ENGINEERING THROUGH HYBRID KNOWLEDGE REPRESENTATION

(71) Applicant: International Business Machines Corporation, Armonk, NY (US)

(72) Inventors: Marcio Ferreira Moreno, Copacabana (BR); Daniel Salles Civitarese, Rio de Janeiro (BR); Lucas Correia Villa Real, Sao Paulo (BR); Rafael Rossi de Mello Brandao, Botafogo (BR); Renato Fontoura de Gusmao Cerqueira, Barra da Tijuca (BR)

(73) Assignee: International Business Machines Corporation, Armonk, NY (US)

(*) Notice: Subject to any disclaimer, the term of this patent is extended or adjusted under 35 U.S.C. 154(b) by 1038 days.

(21) Appl. No.: 16/279,323

(22) Filed: Feb. 19, 2019

(65) Prior Publication Data
US 2020/0265324 A1    Aug. 20, 2020

(51) Int. Cl.
*G06N 5/022* (2023.01)
*G06N 20/00* (2019.01)
(Continued)

(52) U.S. Cl.
CPC ......... *G06N 5/022* (2013.01); *G06F 16/9024* (2019.01); *G06F 16/90335* (2019.01); *G06N 20/00* (2019.01)

(58) Field of Classification Search
CPC .............. G06N 5/022; G06F 16/90335; G06F 16/9024

(Continued)

(56) References Cited

U.S. PATENT DOCUMENTS 7,139,764 B2    11/2006    Lee
8,417,715 B1*   4/2013    Bruckhaus ............. G06Q 10/04
                                           705/26.1
(Continued)

FOREIGN PATENT DOCUMENTS

CN    108009643 A    5/2018
JP    2008233964 B2   10/2008
WO    2018013566 A1    1/2018

OTHER PUBLICATIONS

Optimal division of data for neural network models in water resources applications (Year: 2002).*
(Continued)

*Primary Examiner* — Omar F Fernandez Rivas
*Assistant Examiner* — Em N Trieu
(74) *Attorney, Agent, or Firm* — Scully, Scott, Murphy & Presser, P.C.; Peter J. Edwards

(57) ABSTRACT

A hybrid knowledge representation is searched for a machine learning component corresponding to a search query. The hybrid knowledge representation may be structured as nodes representing machine learning workflow components and edges (e.g., links) connecting the nodes based on relationships between the nodes. Responsive to finding the machine learning component in the hybrid knowledge representation, the machine learning component is returned. Responsive to not finding the machine learning component in the hybrid knowledge representation, the hybrid knowledge representation is searched for machine learning model fragments associated with building the machine learning component, generating a new machine learning component by combining the machine learning model fragments and returning the new machine learning component.

20 Claims, 12 Drawing Sheets

(51) Int. Cl.
*G06F 16/903* (2019.01)
*G06F 16/901* (2019.01)

(58) Field of Classification Search
USPC .......................................................... 706/12
See application file for complete search history.

(56) References Cited

U.S. PATENT DOCUMENTS

| | | | |
|---|---|---|---|
| 2006/0217818 A1 | 9/2006 | Fujiwara | |
| 2009/0016599 A1 | 1/2009 | Eaton | |
| 2014/0189702 A1 | 7/2014 | Yan | |
| 2016/0358103 A1 | 12/2016 | Bowers | |
| 2017/0124451 A1* | 5/2017 | Barham | G06N 3/063 |
| 2017/0286839 A1 | 10/2017 | Parker | |
| 2018/0082183 A1 | 3/2018 | Hertz | |
| 2018/0129967 A1* | 5/2018 | Herreshoff | G06N 5/02 |
| 2019/0073607 A1* | 3/2019 | Jia | G06N 20/00 |
| 2019/0228673 A1* | 7/2019 | Dolsma | G09B 7/04 |
| 2019/0362222 A1* | 11/2019 | Chen | G06F 11/3476 |
| 2020/0117999 A1* | 4/2020 | Yoon | G06F 12/0811 |
| 2020/0249998 A1* | 8/2020 | Che | G06N 20/00 |

OTHER PUBLICATIONS

Lokuciejewski, P., "Automatic Selection of Machine Learning Models for Compiler Heuristic Generation", Proceedings of the 4th Workshop on Statistical and Machine Learning Approaches to Architecture and Compilation SMART 2010, Jan. 24, 2010, 15 pages.

Feuz, S., et al., "Ranking and Automatic Selection of Machine Learning Models", Technical Disclosure Commons, Defensive Publication Series, Dec. 13, 2017, 34 pages.

Low, Y., et al., "Distributed GraphLab: a framework for machine learning and data mining in the cloud", Proceedings of the VLDB Endowment, Aug. 2012, pp. 716-727, vol. 5, Issue 8.

Feurer, M., et al., "Efficient and robust automated machine learning", Advances in Neural Information Processing Systems, 2015, 9 pages.

Abadi, M., et al., "TensorFlow: Large-Scale Machine Learning on Heterogeneous Distributed Systems", arXiv:1603.04467v2 [cs.DC], Mar. 16, 2016, 19 pages.

* cited by examiner

MACHINE LEARNING ENGINEERING THROUGH HYBRID KNOWLEDGE REPRESENTATION

BACKGROUND

The present application relates generally to computers and computer applications, and more particularly to creating and retrieving machine learning models and datasets.

Machine learning models can be created to perform different tasks. Some models may include many different sub-structures, each of which may be related to one specific step in the machine learning workflow. In some cases, created models are stored or distributed in repositories, for example, for later use, but without much information about their locations or about their capabilities, e.g., specific tasks the models can perform.

BRIEF SUMMARY

In one aspect, a method and system to handle machine learning engineering may be provided. A method, in one aspect, may include receiving a search query. The method may also include searching a hybrid knowledge representation stored on a memory device for a machine learning component corresponding to the search query, the hybrid knowledge representation comprising nodes representing machine learning workflow components and edges connecting the nodes based on relationships between the nodes. The method may also include, responsive to finding the machine learning component in the hybrid knowledge representation, returning the machine learning component. The method may also include, responsive to not finding the machine learning component in the hybrid knowledge representation, searching the hybrid knowledge representation for machine learning model fragments associated with building the machine learning component, generating a new machine learning component by combining the machine learning model fragments and returning the new machine learning component.

A method, in another aspect, may include receiving a specification. The method may also include parsing the specification and identifying from the specification a machine learning task. The method may also include searching a hybrid knowledge representation stored in a memory device for a machine learning model that performs the machine learning task. In one aspect, the hybrid knowledge representation comprises nodes representing machine learning workflow components and edges connecting the nodes based on relationships between the nodes. The method may also include, responsive to not finding the machine learning model in the hybrid knowledge representation, searching the hybrid knowledge representation for machine learning model fragments associated with the machine learning task, and generating a new machine learning model to perform the machine learning task by combining the machine learning model fragments.

A system, in one aspect, may include a hardware processor. A memory device may be operatively coupled with the hardware processor, the memory device may store a hybrid knowledge representation comprising nodes representing machine learning workflow components and edges connecting the nodes based on relationships between the nodes. The hardware processor may be operable to receive a specification. The hardware processor may be also operable to parse the specification and identify from the specification a machine learning task. The hardware processor may be also operable to search the hybrid knowledge representation for a machine learning model that performs the machine learning task. Responsive to finding the machine learning model in the hybrid knowledge representation, the hardware processor may be also operable to return the machine learning model. Responsive to not finding the machine learning model in the hybrid knowledge representation, the hardware processor may be also operable to search the hybrid knowledge representation for machine learning model fragments associated with the machine learning task, and generate a new machine learning model to perform the machine learning task by combining the machine learning model fragments.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
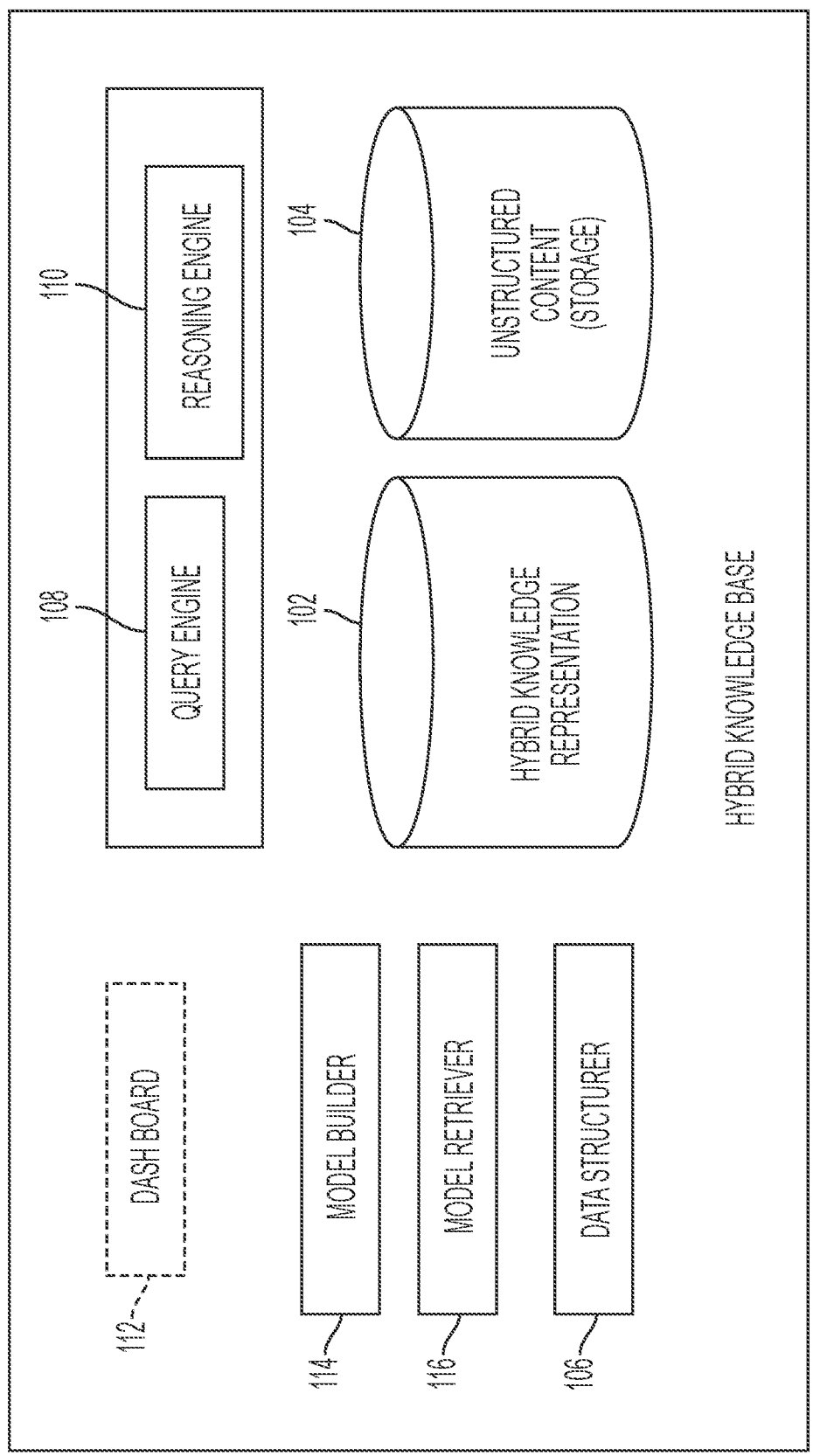
FIG. 1 is a diagram illustrating system architecture in one embodiment.

A system, method and technique may be presented, which structure tasks in machine learning context into hybrid knowledge representations, for example, by implementing a set of elements or specific tasks. Using the hybrid knowledge representations, a system and/or method can automatize or automate a process of creating and retrieving machine learning components. For instance, machine learning models, datasets, and metrics for machine learning (ML) tasks may be retrieved or automatically created. In some embodiments, a hybrid graph representation is implemented which represents aspects considered in modeling different machine learning tasks. To provide a machine learning workflow, in some embodiments, tasks are structured in a knowledge graph containing semantics of databases, datasets, pre-processing steps, parts of a machine learning model topology, training mechanisms and metrics. This knowledge graph can be used to support queries, including assisted queries, for example, to an end user. Such a hybrid graph representation can allow users to specify and reuse components (e.g., dataset, neural networks, support vector machine (SVM), and other machine learning models), fully or fragments of the components (e.g., subset of a dataset, sub-parts of a neural network related to feature extraction, and/or others). In one aspect, a disclosed methodology foresees automatic creation and retrieval of machine learning components, and an entire machine learning pipeline through a provided high-level meaning specification, including a generation of metrics and datasets, and also splitting of the metrics and/or datasets for training, validating and testing. In one aspect, machine learning workflow components may include machine learning network topology fragments. Machine learning network topology fragments (also referred to as fragments) may include an input layer fragment, an output layer fragment, a data transformation fragment (e.g., residual, skip-connection, feature extraction, and/or others), and a task-purpose fragment (e.g., classification, regression, clustering, segmentation, translation, object-detection, and/or others).

A methodology in some embodiments handles an automatic creation of machine learning components according to a specification referred to as a "meaning specification". A meaning specification in the present disclosure may include characteristics about datasets, models, and metrics that a user can specify. In some embodiments, a methodology in the present disclosure includes storing a representation of a model and the model's fragments. By using a hybrid-knowledge graph, those components can be used to compose a new model according to the user's meaning specification. A methodology in some embodiment also can handle automatic retrieval of machine learning models or fragments of machine learning models through meaning specifications, automatic generation of machine learning models through meaning specifications, automatic dataset generation and metrics linking to generated models for specific tasks, automatic generation of semantic specification of generated models, and machine learning engineering visualization through hybrid knowledge representation.

A hybrid knowledge representation in some embodiments is capable of specifying meaning or characteristics of models, parts of the models, datasets, metrics, and an entire machine learning engineering process. A search engine may be implemented to enable retrieval of machine learning models or datasets according to a user's demand or request, for example, specified via a meaning specification. The search engine may be capable of integrating parts of models and parts of datasets to create, respectively, new models and datasets. A methodology in the present disclosure may also include executing the models, and showing how to automatically create metrics associated with the executed models. New models and datasets, which are created, may be automatically annotated with metadata that define their semantics. A methodology in the present disclosure may also include providing, for example, via a user interface, visualizations associated with an entire machine learning process.

FIG. 1 is a diagram illustrating system architecture in one embodiment. The system may be also referred to as a hybrid knowledge base, which may include data storage (e.g., may be local, distributed and/or cloud-based) and computer executable components or functionalities (e.g., which also may be local, distributed and/or cloud-based). The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. One or more of the components shown may be distributed over one or more processors, which may be connected via a network. For example, one or more computers or processors may be communicatively coupled, for example, over a network.

System's architecture may include different types of storage, e.g., one for a hybrid knowledge representation 102 and another for unstructured content 104. The storage may include computer storage or memory devices. In some embodiments, hybrid knowledge representation 102 stores structured representation of machine learning components and associated contents, which may refer to (or reference indirectly) content stored remotely or stored in a second type of, or another, storage. For instance, unstructured content, which the structured content may refer, may be stored on an unstructured content storage 104. In hybrid knowledge representation 102, it is possible to refer to multimedia data which is stored in the unstructured content storage 104 that may be used by the machine learning components as well as the models per se. For example, the hybrid knowledge representation 102 may include a reference (e.g., a pointer) to the unstructured data stored in the unstructured content storage 104. A storage unit may use a hybrid knowledge representation 102 to support both query 108 and reasoning 110 engines. In one aspect, the hybrid representation 102 provides expressiveness to describe concepts, mechanisms, machine learning models, and data. There may be two types of storage: one storing structured knowledge 102 and another unstructured content 104.

Hybrid knowledge representation 102 may structure data pre-processing, defining datasets, machine learning model topology, specifying training mechanisms and evaluation metrics involved in machine learning model training and execution into a knowledge graph, via which those processes can be automated.

A data structurer component 106 includes a computer executable functionality that structures data into datasets, and aligns entities created by the user with the structures present in the knowledge base 102, for instance, using ontology alignment techniques. The hybrid knowledge representation 102 may be accessed by a query engine 108 and a reasoning engine 110. The query engine 108 and the reasoning engine 110 can be computer executable components performing query and reasoning functionalities. The query engine 108 includes a query language and application programming interfaces (APIs) for retrieving data and answering questions according to what is stored in hybrid knowledge representation 102 and unstructured content 104. Query engine's query language and APIs support question answering and content retrieval. In one aspect, the query engine 108 may use services from reasoning engine 110 to enhance its outcome. The reasoning engine 110 may include all services that actively infer new concepts from understanding hybrid knowledge representation 102. For example, the reasoning engine 110 can be used to reason about the hierarchy in a taxonomy, retrieving an instance when a question is asked about a class represented in the hybrid knowledge representation 102.

A model retriever component 116 performs retrieval of machine learning components and a model builder component 114 creates machine learning models. The data structurer component 106 supports dataset creation. For instance, the model retriever component 116 may include functionality of fetching a machine learning model capable of performing a given task, for example, requested via querying supported by the query engine 108, and receiving the model, and for example, communicating the received model to a user interface or a dashboard component 112. A model builder component 114 may reuse fragments from one or a plurality of machine learning models associated with a given task and combine these fragments to create a new machine learning model. In one aspect, users may use the dashboard component 112 or a user interface (UI) to specify queries. The dashboard component 112 may invoke the query engine 108 to perform the associated query. Depending on the query, the model retriever component 116 or the model builder component 114 may be invoked. For instance, the model retriever component 116 is invoked to retrieve existent or stored models. The model builder component 114 is invoked to create a new model.

The dashboard component 112 may include a graphical user interface which allows for user-computer interactions. For instance, the dashboard component 112 allows users to input queries, allows a computer processor to receive user input queries. Results of queries and/or other data may be presented to a user via the dashboard component 112. In one aspect, the dashboard component 112 may include a front-end application, which may run on a user device.

In machine learning engineering workflows, for example, in the process of creating and using a machine learning model for a specific task, a user may specify steps to pre-process input raw data, create a neural network topology and define how to train the model. Regarding the network topology creation, each part of such topology may have a reason to be where it is placed and includes specific connectivity of the parts of the topology. A methodology of the present disclosure in one embodiment structures such steps and/or components and/or fragments of components as a hybrid knowledge representation including nodes and connected edges. Components or nodes can be computer executable objects and datasets, or representations of symbolic nodes (e.g. concepts), computer executable objects, multimodal content, and datasets.

Figure 2:
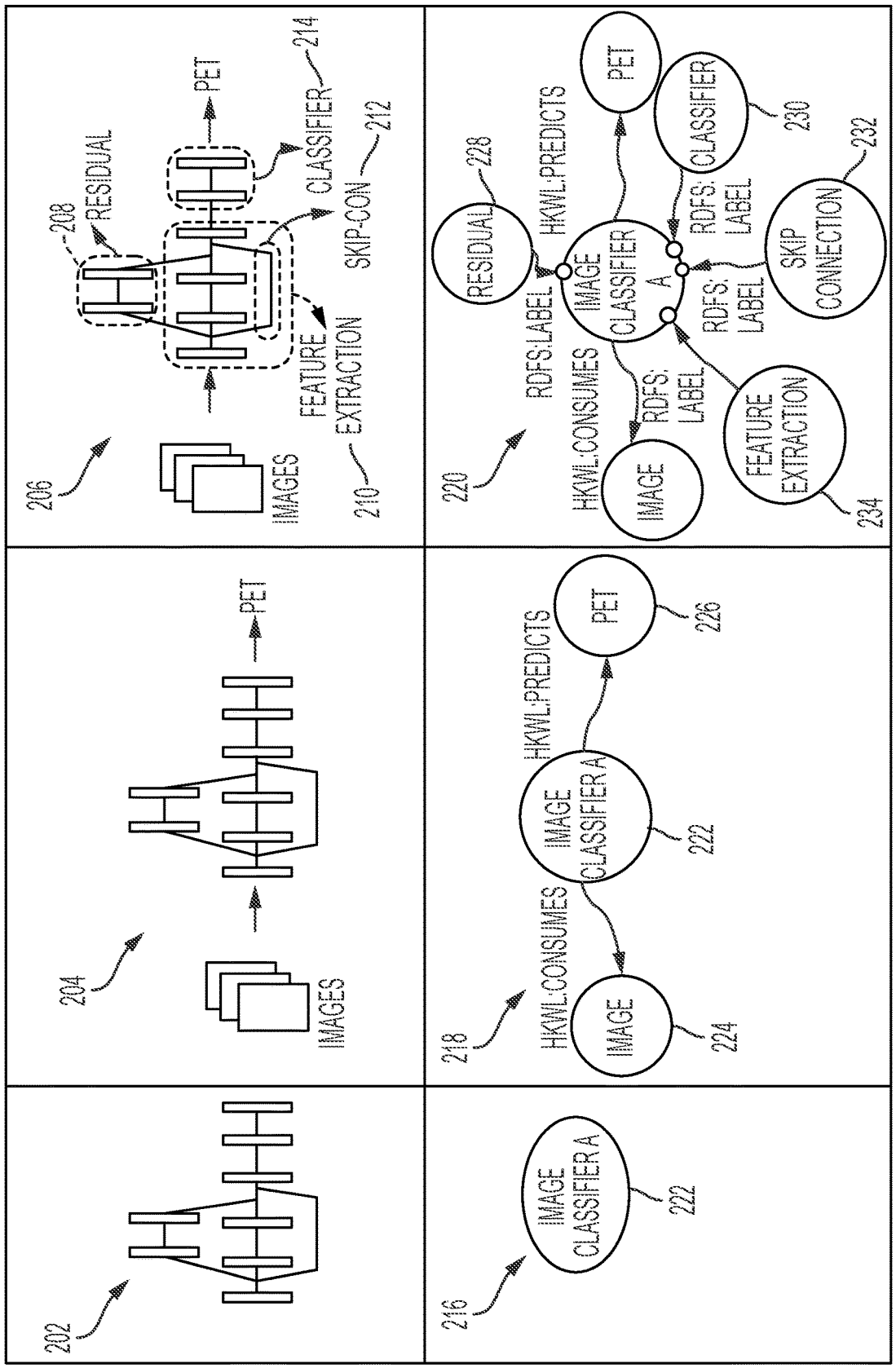
FIG. 2 show a diagram illustrating a neural network engineering workflow or process in one embodiment.

FIG. 2 shows a diagram illustrating a neural network engineering workflow and neural network topology in one embodiment. Illustrations shown at 202, 204 and 206 depict an example neural network. Consider for example, a neural network which functions to classify pets given a collection of images. Several fragments may integrate the neural network: e.g., a residual component 208, a feature extraction 210, a skip connection 212, and a classifier 214.

Illustrations at 216, 218 and 220 show how a neural network (e.g., shown at 202, 204, 206) can be modeled on hybrid knowledge representation or specification using graph elements. All components integrating the neural network at 206 can be encapsulated in elements that connect to an "image classifier A" 222. As shown at 218, a methodology of the present disclosure in some embodiments connects two entities with that classifier element 222: an image 224 (which the image classifier 222 consumes) and a pet 226 (which the image classifier 222 predicts). In some embodiments, this disclosure may provide several ways to specify the semantics of the fragments and how to connect them. For example, one method includes an annotation process through the dashboard 112. For instance, a user via a user interface may input annotations associated with machine learning model fragments and components involved in machine learning engineering workflow. Another method includes automatic pattern matching, in which the system of the present disclosure is capable of learning their semantics. Further, the methodology of the present disclosure in some embodiments connects several entities that provide meaningful representations (labels) of their outcomes, for example, by using an ontology representing the background knowledge of the machine learning domain combined with pattern matching and annotation processes. Those entities may include residual entity 228, classifier 230, skip connection entity 232, and feature extraction 234.

Structured representation can be represented based, for example, on Resource Description Framework (RDF) and/or Resource Description Framework Schema (RDFS) constructs. Graph elements or components can be connected via relationships specified in such schema. For example, "rdfs:label", "rdf:type" are shown. Other definitions can be used. For instance, "rdf:type" semantics states that a resource is an instance of a class; "rdfs:label" provides readable version of a resource's name.

Figure 3A:
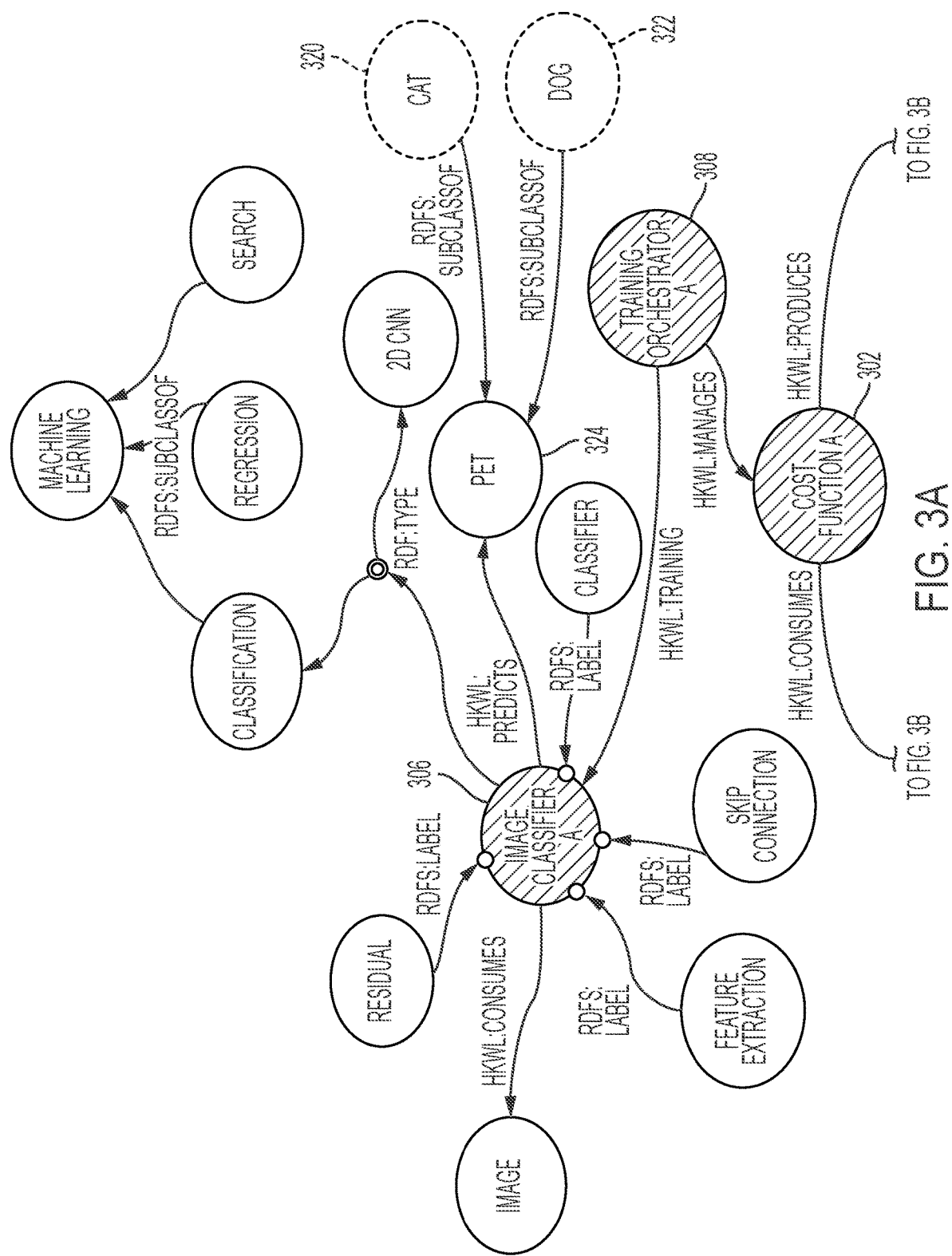
FIGS. 3A and 3B illustrates a machine learning engineering process in detail in one embodiment.
Figure 3B:
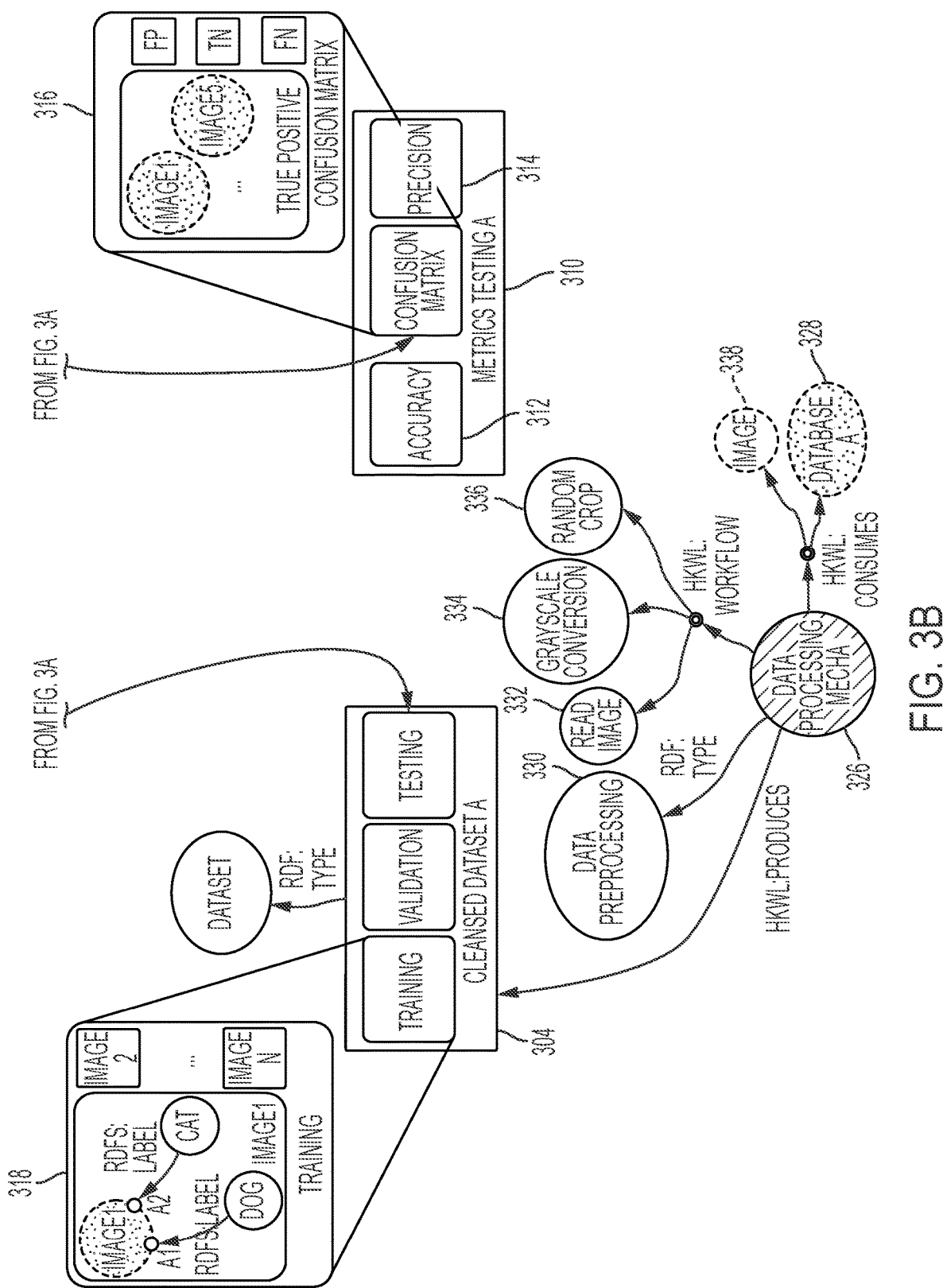

FIGS. 3A and 3B illustrate a machine learning engineering process in detail in one embodiment. Connected graph elements, e.g., also referred to as a hybrid knowledge representation, shown in FIGS. 3A and 3B, represent steps of a machine learning engineering workflow. For instance, pre-processing steps, fragments of machine learning model's network topology (e.g., neural network topology), training mechanisms and metrics with task and dataset. The diagram, for example, shows connected elements to a neural network 306, such as datasets 304 that provide a training set, validation, and testing resources for the neural network 306.

As example, a user can create a machine learning task to identify both pets such as cats and dogs with no need for prior experience with neural network modeling. For example, using an annotation mechanism it is possible to connect symbolic entities (i.e., conceptual nodes), e.g. Dog 320 and Cat 322, reusing concepts from a specific ontology, to provide the semantics for the desired classification process. Since a hybrid knowledge base is a searchable database, a user can search for existing entities by name (such as "Lion" or "Horse") and easily extend the neural network so that the neural network can include these two subjects (e.g., lion and horse) on future image classifications. In this specific example, the neural network can be retrained by changing the datasets to recognize the extended subject, without needing to extend or change the neural network topology.

A cost function A 302 consumes datasets 304 and provides training data to an image classifier 306 with a help of a training orchestrator 308. A cost function may be created manually or automatically. For instance, a cost function may be manually injected in a hybrid knowledge representation system to be represented as a node in the hybrid knowledge representation. As another example, a cost function may already be represented as a node in the hybrid knowledge representation. In one aspect, the relationships and semantics of the nodes may be specified by an annotation process via a user interface (e.g., a dashboard shown in FIG. 1, 112). In another aspect, the relationships and semantics of the nodes may be specified automatically through pattern matching, where the hybrid knowledge representation system is capable of extracting and learning their semantics.

The extraction may include extracting information about which dataset is used by the mechanism that composes the cost function. The training orchestrator 308 is a mechanism, which may be created manually (e.g., by a user) or automatically (e.g., the hybrid knowledge representation system). In machine learning, a training orchestrator handles selecting an appropriate set of data in a dataset, for example, according to a task to be performed, e.g., train, validate, and/or test. Training data representation is shown at 318. During execution of the created model having as input the testing and validation sets of data 304, the same cost function 302 produces metrics 310 such as an accuracy 312 and precision 314 of the model, supported by other entities such as a confusion matrix entity 316 that computes the number of false positives, true negatives, false negatives, and true positives observed in the model's outcomes.

Hybrid knowledge representation may also include data preprocessing components 326, 328, 330, 332, 334, 336, 338 that represent the steps of the data preprocessing workflow, for instance, which can process raw data to produce a dataset 304, for instance, for training, testing, and/or validating a machine learning model 306.

Hybrid knowledge representation graph elements can be used or reused, as in Cat 320 and Dog 322 subclasses of Pet element 324 output by image classifier A 306 to enrich the model and to describe the overall pipeline of machine learning engineering workflows. In one embodiment, existing ontologies may be retrieved and use to determine concepts and their relationships. Items 302, 306, 308 and 326 in this hybrid knowledge representation graph represent functions or executable code. Items labeled "image1" in 318 and databaseA 328 represent data content (e.g., images, databases, etc.). Rest of the items shown as round circles represent concepts, for example, which can be reused from existent ontologies or defined by the hybrid knowledge representation system. Items shown by rectangles represent a set of concepts and links. This set may also have other nested sets.

Figure 4:
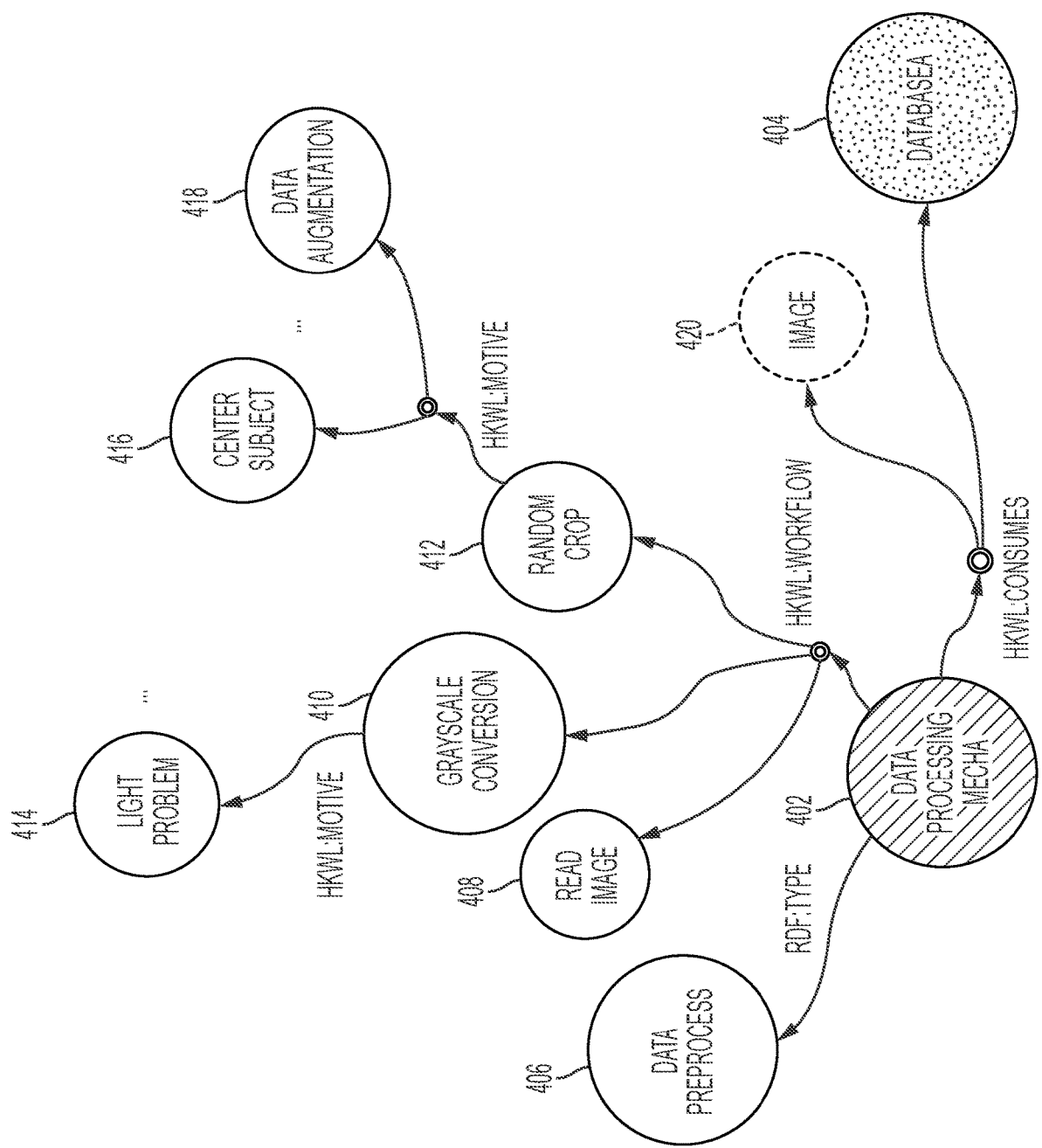
FIG. 4 is a diagram illustrating data pre-processing components in one embodiment.

FIG. 4 is a diagram illustrating data pre-processing components in one embodiment, for instance, also shown in FIG. 3B at 326. A hybrid knowledge representation may also include components, which are used to pre-process data for machine learning model creation. A step in creating a machine learning model may be pre-processing of input raw data, for instance, to create a training set, a test set and/or a validation set. A hybrid knowledge representation in the present disclosure stores components which can be put together to perform such data pre-processing. For instance, consider that a user desires to create a predictive model to classify images. A hybrid knowledge representation in FIG. 4 describes this process in a high-level abstraction form. This representation is composed by nodes and links or relationships. Nodes 406, 408, 410, 412, 414, 416, 418 and 420 are concepts, node 402 is a mechanism (function) or an executable code, and node 404 is data. There are semantics in the relationships. This representation structures that data preprocessing mechanism 402 is a type of data preprocess 406, consumes images 420 from a database 'A' 404, and has a workflow with well defined steps. This structure or structural representation (e.g., nodes and links based on relationships between nodes) can be built based on performing an automatic pattern extraction, for instance, using existing ontologies (which store concepts and relationships). In another aspect, this structure can be built based on user input. For instance, a user interface can be provided, via which a user can specify nodes and relationships. Such structured hybrid knowledge representation can also store or include metatdata associated with the nodes and/or relationships, which describe (e.g., as structured attributes) the nodes and the relationships. For instance, various attributes associated with nodes and relationships can be stored as part of the hybrid knowledge representation.

In some embodiment, a hybrid knowledge representation of the present disclosure can support different types of queries. Examples of queries may include, but are not limited to, the following queries:

SELECT ML models to locate and identify animals in a video from drones. Responsive to receiving such a query, a methodology of the present disclosure, even if there is no existing model for this specific task, can put together: 1. feature extractors that identify animals; 2. classifiers that separates different animals; 3. object detections mechanisms from other tasks. The order of those blocks is also represented in the hybrid knowledge representation (hkwl).

SELECT ML models to classify images that can handle small inputs (e.g.: 40×40 images). Responsive to receiving such a query, a methodology of the present disclosure can combine a feature extractor with a linear classifier to accomplish this task. For instance, once fragments are stored and annotated in the hybrid knowledge representation database, the system of the present disclosure can search for the most suitable model available in the database. For example, in order to classify small inputs, the system search for all classifiers stored and annotated in the database. Annotations can provide the input size of the models. Based on the annotations, the system can rank the available models based on its characteristics.

SELECT ML models to convert speech to text and translate from one language to another. Responsive to receiving such a query, a methodology of the present disclosure can: 1. combine a recurrent mechanism to the speech part or add Mel filters to transform "audio to image" and append a feature extractor; 2. append an encoder to convert the original language to "space-A"; and 3. append a decoder to convert features in "space-A" to the final language. For instance, as described above, a hybrid knowledge representation can have a database storing annotated models (e.g., machine learning models such as neural network models) and fragments of models. In this example, a system or methodology of the present disclosure supporting queries of hybrid knowledge representation can break this query into two main parts: (1) speech-to-text and (2) translation. For each part, the system can search for similar experiments that accomplished the same task. For example, the system can search for models that convert speech to text, such as recurrency or mel-filters. The system can also search for already annotated workflows that perform translation, for example, a convolutional neural network (CNN). The system combines both parts by constructing and presenting a model with the output of part (1) as input for part (2).

In one aspect, a method and system of the present disclosure may include automatic retrieval of machine learning models; automatic retrieval of fragments of machine learning models; automatic creation of machine learning models through meaning specification; automatic dataset generation and metrics linking for created models for a specific tasks; automatic semantic specification of created models; and automatic training, validation and testing split according to the dataset characteristics (e.g., size, type).

Figure 8:
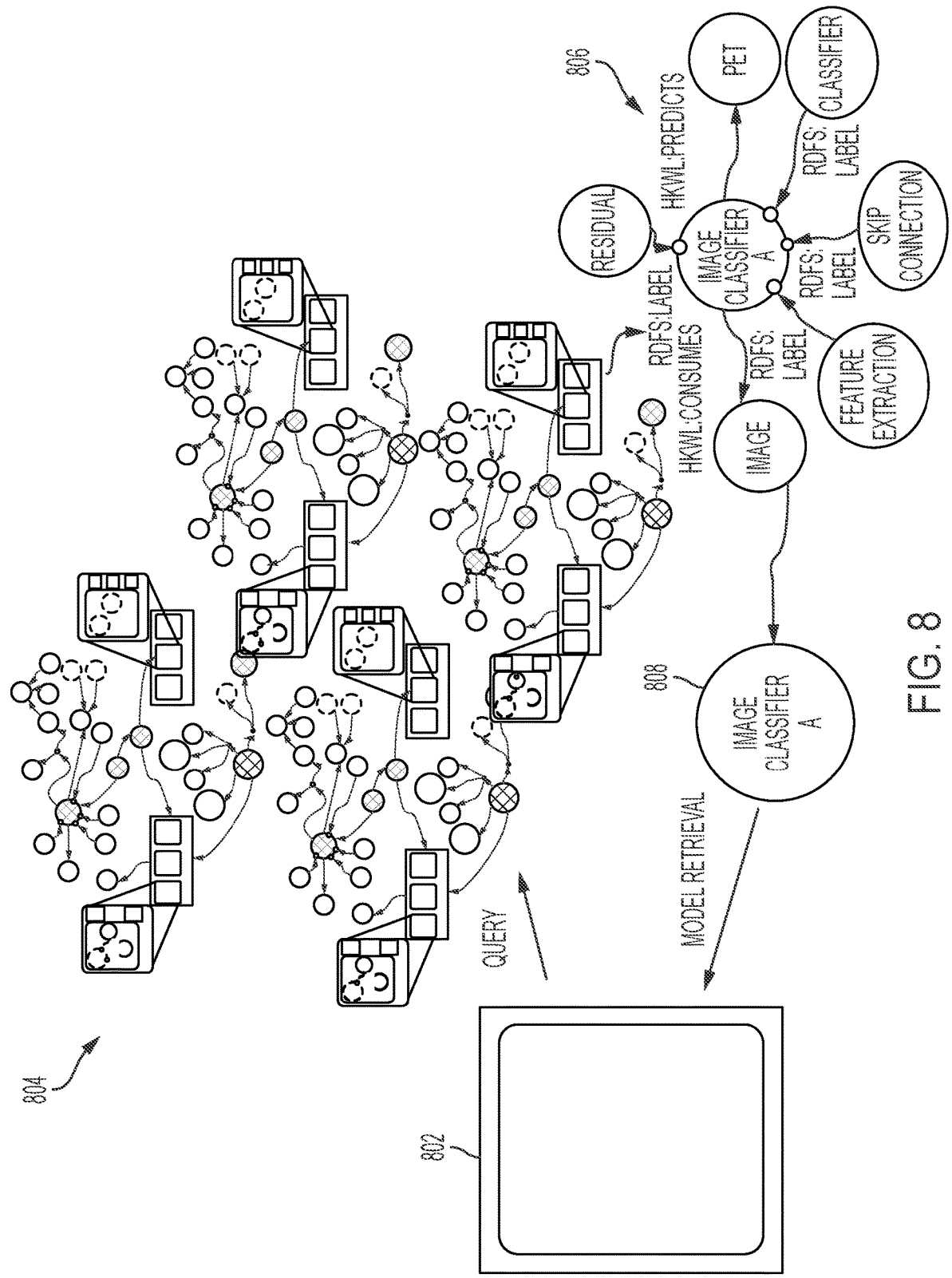
FIG. 8 is a diagram illustrating this example scenario of machine learning model retrieval in one embodiment.

The following describes an example of machine learning model retrieval via hybrid knowledge base including hybrid knowledge representation of the present disclosure in one embodiment. For instance, consider that a user is given a task to classify objects in images, e.g., "wild animals" in images. Via a dashboard or user interface, a user may enter a query, requesting to list machine learning models, which can handle the requested task, for example, classify "wild animals" that appear in images. A computer process (e.g., a system or method executing on a hardware processor) receives the user's query, searches a knowledge base (e.g., including hybrid knowledge representation), and identifies a previously created machine learning process that is related to animal classification. Consider, however, that the identified machine learning process was created to classify pets or domestic animals (e.g., shown in FIGS. 3A and 3B as example). In some embodiments, a methodology of the present disclosure can infer according to its ontology that classification of pets or domestic animals is a related or same task as classifying "wild animals" requested by the user. Ontology may already exist, for example, stored in a storage media, which can be accessed by a system or method. In another aspect, a user may inject ontology via a dashboard. Briefly, ontology specifies concepts and relationships, for example, which can be represented as structured data and stored on a computer readable or accessible storage device or medium. The methodology may retrieve, not only the identified previously created machine learning model, but all other related information, so that the user can have an understanding of a whole machine learning pipeline. Related information that can be retrieved may include, but are not limited to, metrics, dataset used to train the model, information about the model (e.g., whether it is a classifier, a linear regression, a 2-dimensional CNN, and/or others), a specific type of data that works with the model, and/or a specific type of data that does not work with the model (this information may be inferred by processing the metrics), and/or others. The retrieved or created model may be used to perform a desired task. For instance, a user may use the model to perform the user's task. In another aspect, the representation of the retrieved or created model may be used as a studio such that a user, via a system of the present disclosure, can fine-tune a machine learning workflow, for example, by reusing fragments from other models, by creating new ones, changing parameters, and/or others. FIG. 8 is a diagram illustrating this example scenario of machine learning model retrieval in one embodiment. A specification entered by a user, for example, may be received, via a user interface or dashboard 802. The specification, for instance, may include a query or characteristics of a given machine learning task. A computer process implementing a methodology of the present disclosure performs a search on hybrid knowledge representations comprising machine learning models and components 804, and finds components 806 related to the given machine learning task including a model 808. An identified model 808 related to the given machine learning task is presented to the user via the user interface 802.

The following describes an example of machine learning model creation via hybrid knowledge base including hybrid knowledge representation of the present disclosure in one embodiment. Consider that a user is given a task of converting speech to text and translating from one language to another language, for example, English to Dutch. Via a dashboard or user interface, a user may enter a query, requesting for or to list machine learning models, which can handle the requested task, for instance, a list of machine learning models which can convert speech to text and translate English to Dutch. A computer process executing a methodology of the present disclosure searches a hybrid knowledge base to identify machine learning models that satisfy the user's request. Consider, however, that this hybrid knowledge base currently does not have in its store machine learning models, which specifically performs English to Dutch language translation. However, the hybrid knowledge base stores machine learning workflows that perform speech-to-text and language translation. Thus, in this example, although there is no model specifically designed to translate from English to Dutch in this particular example hybrid knowledge base, the computer process executing a methodology of the present disclosure finds similar machine learning workflows that perform speech-to-text and language translation. The computer process automatically combines parts of the previously created similar models, for instance, based on relationships created between the models' fragments and concepts that describe their meaning and functioning. For instance, the models and fragments represented in hybrid knowledge representation which are annotated and linked can be identified and/or extracted via pattern matching process. Based on such annotations, links and/or pattern extracting, the parts may be combined for performing a specific task. In one aspect, fragments can be composed by one or multiple layers of networks. For a new model, a user via a dashboard or another user interface may select a new dataset, appropriate to a new task. In another aspect, queries can be made to select and/or create a subset of previously defined datasets or a combination of previously defined datasets. The system of the present disclosure can train the new model using this new dataset. Via a dashboard or another user interface, a user may fine-tune the workflow.

Figure 9:
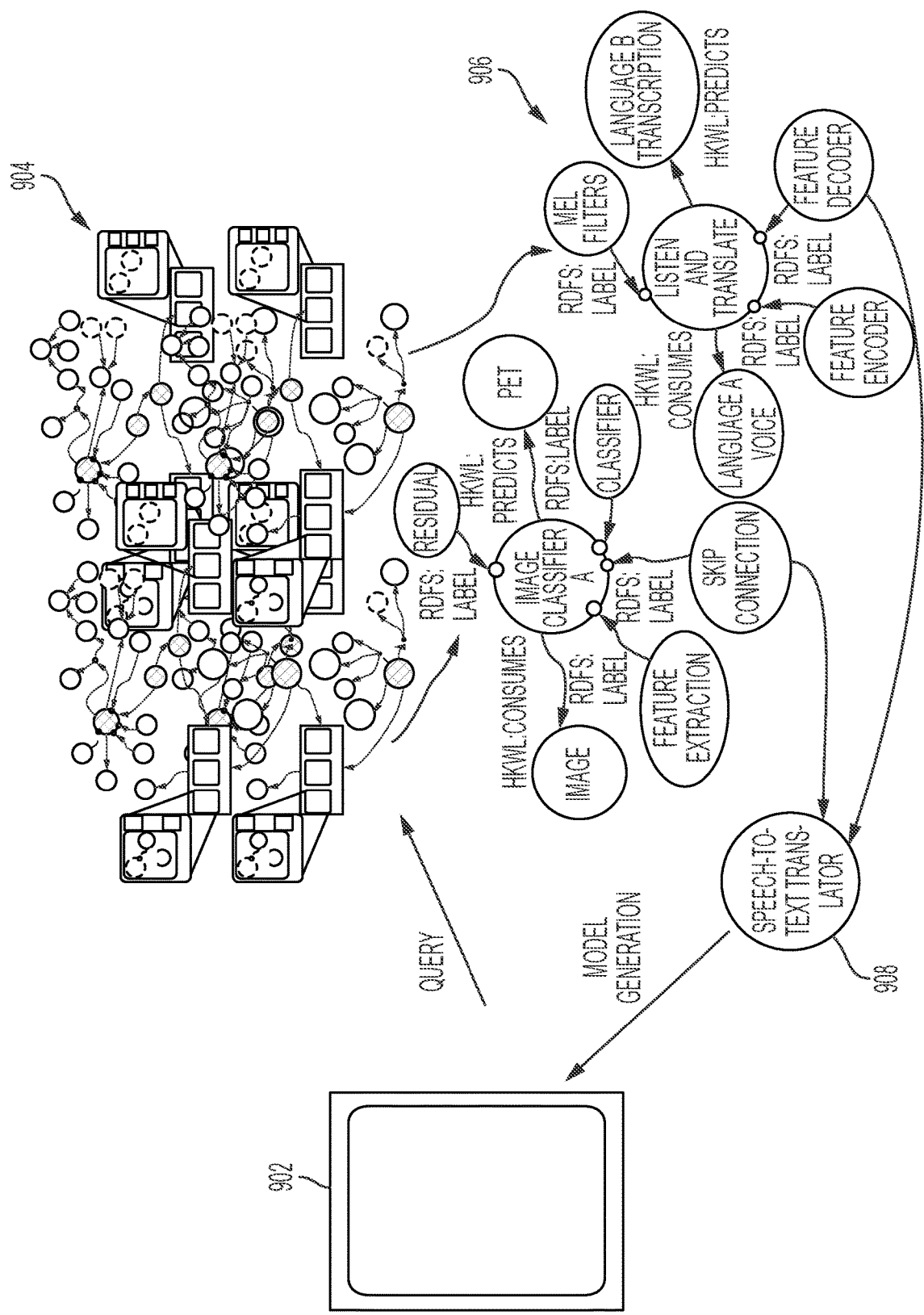
FIG. 9 illustrates an example machine learning model creation via hybrid knowledge base including hybrid knowledge representation of the present disclosure in one embodiment.

FIG. 9 illustrates an example machine learning model creation via hybrid knowledge base including hybrid knowledge representation of the present disclosure in one embodiment. A specification entered by a user, for example, may be received, via a user interface or dashboard 902. The specification, for instance, include a query or characteristics of a given machine learning task. In this example, the specification indicates a query for a machine learning model that converts speech to text and translates from one language to another. A computer process implementing a methodology of the present disclosure performs a search on hybrid knowledge representations 904 comprising machine learning models and components. A computer process executing a methodology of the present disclosure searches a hybrid knowledge base to identify machine learning models that satisfy the user's request or characteristics specified in the specification. Consider, however, that this hybrid knowledge base currently does not have in its store machine learning models, which specifically performs the specifically requested language translation. However, the hybrid knowledge base stores machine learning processes that perform speech-to-text and language translation 906. Thus, in this example, although there is no model specifically designed to perform a particular language translation, the computer process executing a methodology of the present disclosure finds similar machine learning processes 906 that perform speech-to-text and language translation. The computer process automatically generates a new model 908 by combining parts of the previously created similar models 906, for instance, based on relationships created between the models' fragments and concepts that describe their meaning and functioning. The following describes an example scenario referring to FIG. 1 in one embodiment. A user makes a query using the dashboard component 112. The dashboard component 112 delivers the query to the query engine 108, which parses the query and traverses a knowledge graph (e.g., the hybrid knowledge representation 102), also utilizing the reasoning engine 110. The query engine 108 selects fragments by understanding the concepts that are bounded to these fragments, and delivers the fragments to the model builder component 114. The model builder component 114 puts the fragments together and delivers the composed model to the dashboard component 112.

Figure 5:
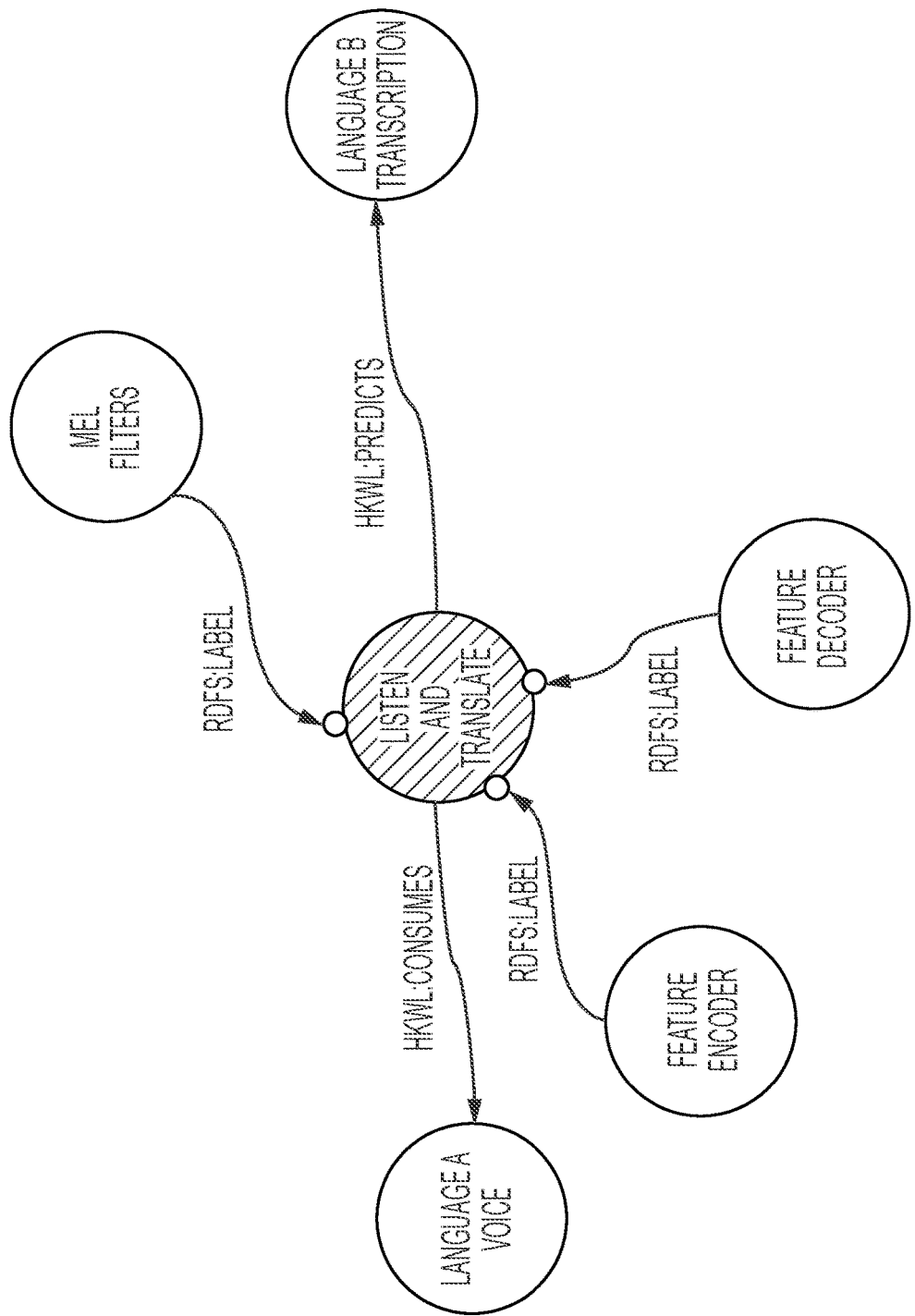
FIG. 5 shows an example of a hybrid knowledge graph representation of a machine learning model created based on a combination of fragments from a hybrid knowledge base in one embodiment.

FIG. 5 shows an example of a machine learning model created based on a combination of fragments from a hybrid knowledge base. For this specific problem, the computer process may combine a recurrent mechanism to the speech part, Mel filters (which apply Mel-frequency scaling) to transform audio, feature extractors, encoders and decoders. For instance, a recurrent mechanism can be added to a speech part or a Mel filter may be added. A feature extractor may be added, an encoder may be appended to convert the original language to "space-A", a decoder may be appended to convert features in "space-A" to the final language. A model builder component (e.g., shown in FIG. 1 or like functionality) may combine fragments to construct a model. For instance, the fragments can be a set of layers. The output of one set can be fully connected to the input of the next set.

In one aspect, hybrid knowledge representations are provided to support machine learning tasks, for example, automatic retrieval and reuse of machine learning models and/or fragments of machine learning models. An automatic dataset creation based on high-level representation of machine learning engineering may be also supported by the hybrid knowledge representations. An automatic suggestion of which metrics are suitable for the task can be supported.

Figure 6:
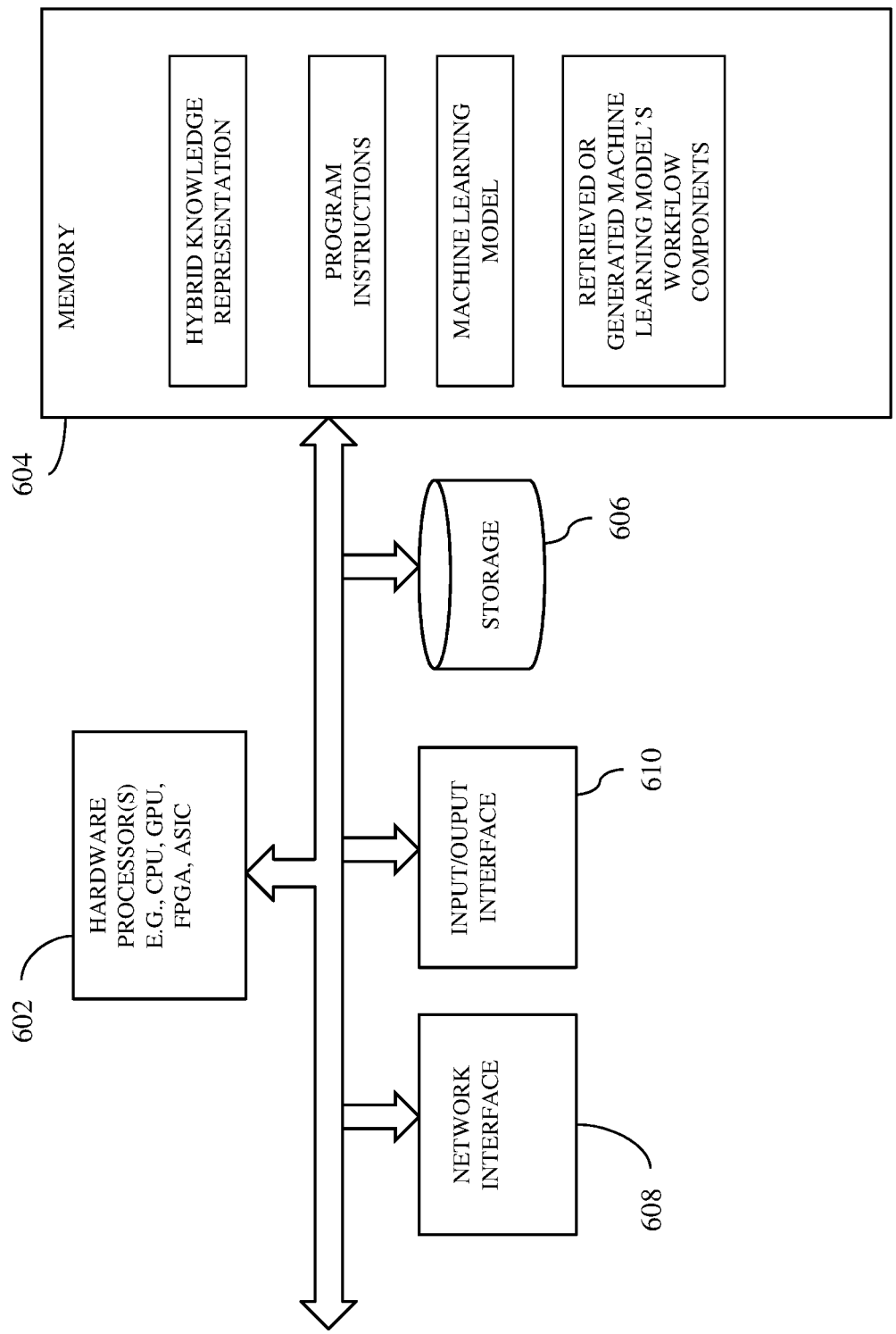
FIG. 6 is a diagram showing components of a system in one embodiment, which may retrieve and/or automatically create machine learning models and/or datasets.

FIG. 6 is a diagram showing components of a system in one embodiment, which may automatically create machine learning models. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and automatically generate a machine learning model. The memory device may include random access memory (RAM), read-only memory (ROM) or another memory device, and may store data and/or processor instructions for implementing various functionalities associated with the methods and/or systems described herein. One or more hardware processors 602 may execute computer instructions stored in the memory or received from another computer device or medium.

The memory device 604 may, for example, store instructions and/or data for functioning of the one or more hardware processors 602, and may include an operating system and other program of instructions and/or data. The memory device 604 may store a hybrid knowledge representation, or at least selective parts of the hybrid knowledge representation. The hybrid knowledge representation may include nodes representing machine learning workflow components and edges connecting the nodes based on relationships between the nodes. The machine learning workflow components may include machine learning network topology components such as, but not limited to, an input layer component, an output layer component, a feature extraction component, a classifier component, a residual layer component, a skip-connection component, a data pre-processing component that generates at least one of a training dataset, a test dataset, and a validation dataset, and a metrics generation component that can generate metrics associated with results produced by a model or running a model. Multiples of such components may be present, for instance, for different tasks. In another aspect, the hybrid knowledge representation may be stored on a storage device 606, or received via a network interface 608 from a remote device, and may be temporarily loaded into the memory device 604, for example, for a search and/or creating a machine learning model.

One or more hardware processors 602 may receive input comprising a specification, for example, which describes a characteristic or characteristics of a given machine learning task, parse the specification and identify from the specification a machine learning task. One or more hardware processors 602 may search the hybrid knowledge representation for a machine learning model that performs the machine learning task. Responsive to finding the machine learning model in the hybrid knowledge representation, one or more hardware processors 602 may present the machine learning model via a user interface. Responsive to not finding the machine learning model in the hybrid knowledge representation, one or more processors 602 may search the hybrid knowledge representation for machine learning model components associated with the machine learning task, and generate a new machine learning model to perform the machine learning task by combining the machine learning model components. One or more processors 602 may also generate a semantic specification associated with the new machine learning model. The semantic specification may include metadata annotating semantics of the new machine learning model.

One or more hardware processors 602 may further provide or present a visualization of the machine learning model's workflow via a user interface, for example, by presenting the hybrid knowledge representation's nodes and connected edges associated with the machine learning model or the new machine learning model. An example visualization is shown at 806 in FIGS. 8 and 906 in FIG. 9, which may be displayed on a display screen.

A retrieved or generated machine learning model may be stored on memory 604, for example, for execution by one or more hardware processors 602. One or more hardware processors 602 may also build the hybrid knowledge representation by structuring the machine learning workflow components into a database and creating metadata associated with the machine learning workflow components. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
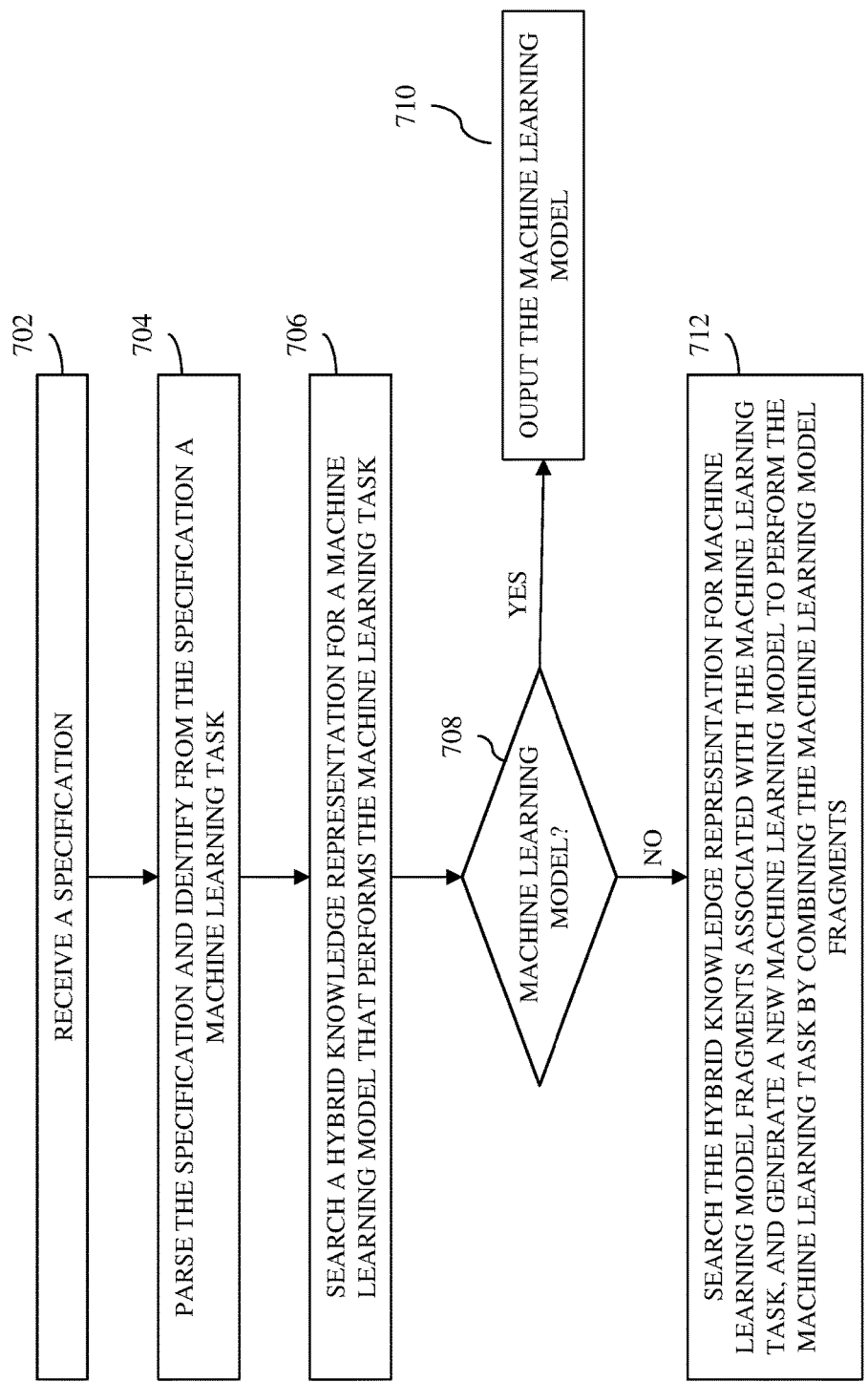
FIG. 7 is a flow diagram illustrating a method in one embodiment, which may retrieve and/or create machine learning models and/or datasets.

FIG. 7 is a flow diagram illustrating a method of automatically creating machine learning models through hybrid knowledge representation in one embodiment. At 702, a specification is received. The specification, for instance, describes a characteristic or characteristics of a given machine learning task. At 704, the specification is parsed to identify a machine learning task. At 706, a hybrid knowledge representation, for example, stored in a memory device, is searched for a machine learning model that performs the machine learning task. In one aspect, the hybrid knowledge representation includes nodes representing machine learning workflow components and edges connecting the nodes based on relationships between the nodes. At 708, it is determined as to whether a machine learning model, which can perform the machine learning task, exists in the hybrid knowledge representation. At 710, responsive to finding the machine learning model in the hybrid knowledge representation, the machine learning model may be presented to a user, for example, via a user interface. At 712, responsive to not finding the machine learning model in the hybrid knowledge representation, the hybrid knowledge representation may be searched for machine learning model fragments associated with the machine learning task. A new machine learning model is generated to perform the machine learning task by combining the machine learning model fragments. Generating the new machine learning model may also include generating a semantic specification associated with the new machine learning model. The semantic specification, for instance, includes metadata annotating semantics of the new machine learning model.

In another aspect, responsive to not finding the machine learning model in the hybrid knowledge representation, a dataset for the new machine learning model may be automatically generated by using a dataset generation component existing in the hybrid knowledge representation. Metrics may be automatically generated, which is associated with executing one of the machine learning model and the new machine learning model.

A method may also include presenting a visualization of a machine learning model's workflow (e.g., the machine learning model found in the hybrid knowledge representation or the generated model dynamically generated responsive to not finding a model in the hybrid knowledge representation) via a user interface, for example, by presenting the hybrid knowledge representation's nodes and connecting edges associated with at least one of the machine learning model and the new machine learning model that is generated. Yet in another aspect, a method may include building the hybrid knowledge representation by structuring the machine learning workflow components into a database and creating metadata associated with the machine learning workflow components.

Figure 10:
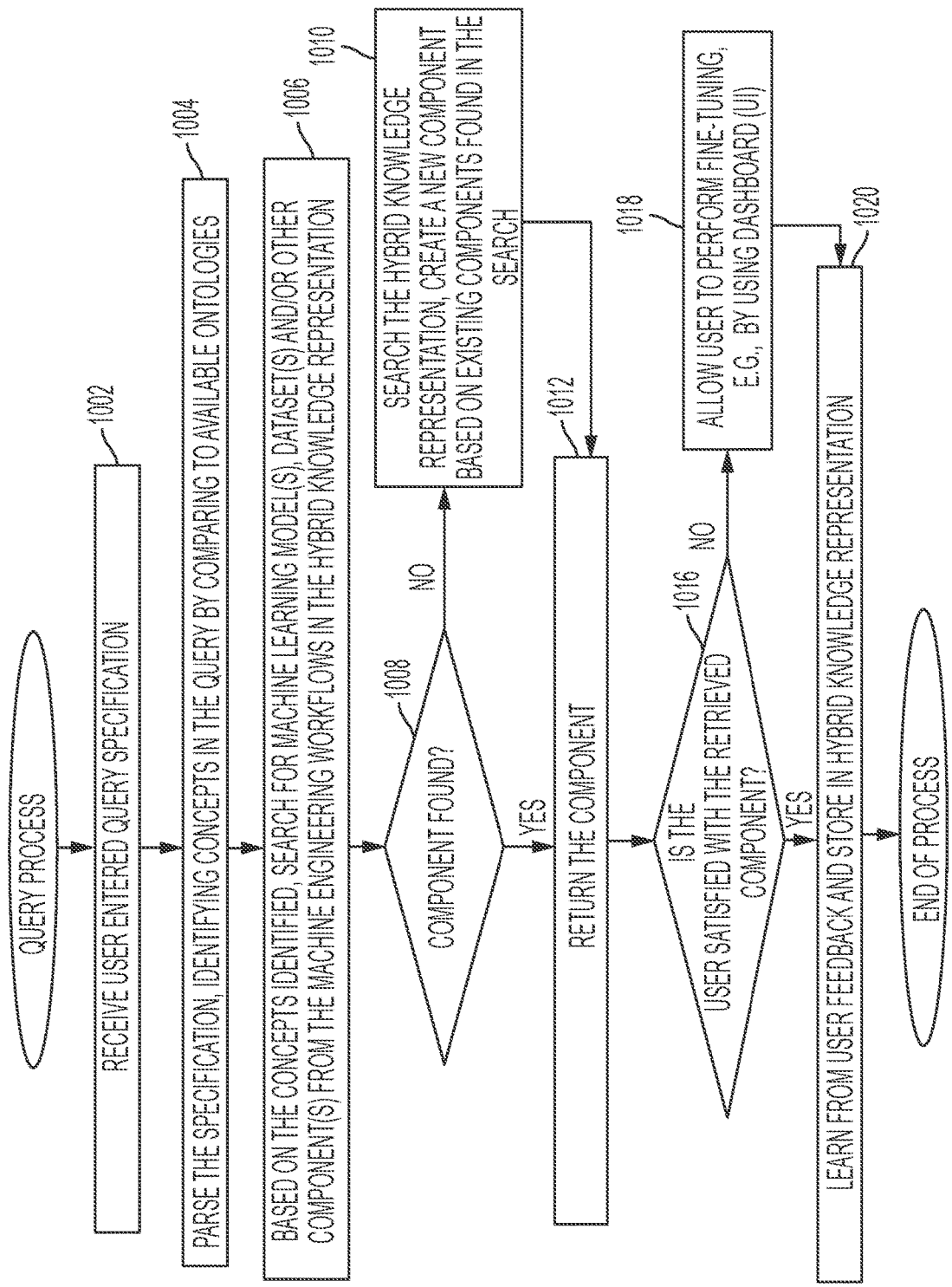
FIG. 10 illustrates another aspect of a method in one embodiment, which may retrieve and/or create machine learning models and/or datasets.

FIG. 10 illustrates another aspect of a method in one embodiment, which may retrieve and/or create machine learning models and/or datasets. The method shown in FIG. 10 is described with reference to components shown in FIG. 1. At 1002, a user entered query or query specification may be received, e.g., via a user interface such as a dashboard. For example, a user may enter a query specification through a dashboard (e.g., FIG. 1, 112). A query engine (e.g., FIG. 1, 108) or like functionality may be invoked, e.g., automatically responsive to receiving the query specification.

At 1004, the query engine or like functionality parses the specification, identifying concepts (e.g., main concepts) in the query by comparing parsed elements to available ontologies. Ontologies may be stored in a repository, for example, along with a hybrid knowledge representation (e.g., FIG. 1, 102).

At 1006, based on the concepts identified, a search is performed for one or more machine learning models, datasets and/or other components from the machine engineering workflows in the hybrid knowledge representation, which satisfy the query specification. For example, the query engine (e.g., FIG. 1, 108) delivers a structured specification (e.g., identified concepts structured as a data structure) to a model retriever (e.g., FIG. 1, 116), which searches for one or more appropriate machine learning models, datasets or other components from the machine engineering workflows in the hybrid knowledge representation (e.g., FIG. 1, 102).

At 1008, it is determined whether an appropriate component (e.g., model, dataset or another component that satisfies the query) is found. If an appropriate component is not found, at 1010, the hybrid knowledge representation is searched for a component or components associated with the specification by pattern matching and/or similarity mechanisms, and a new component (e.g., dataset, machine learning model, and/or another) is generated by combining the existent similar machine learning components, for example, found by pattern matching and/or similarity mechanisms. The created component is returned. For example, the model retriever (e.g., FIG. 1, 116) calls the model builder (e.g., FIG. 1, 114), which searches the hybrid knowledge representation (e.g., FIG. 1, 102) for the components associated with the specification through pattern matching and/or similarity mechanisms, and generates a new component (e.g., dataset, machine learning model, another component) by combining the existing similar machine learning components. The model builder (e.g., FIG. 1, 114) returns the created component to the model retriever (e.g., FIG. 1, 116). The method proceed to 1012.

If at 1008, an appropriate component is found, the method proceeds to 1012. At 1012, the component (e.g., found in the search at 1008 or newly constructed at 1010) is returned, for example, for presenting to a user. For example, the model retriever (e.g., FIG. 1, 116) returns the component or components to the dashboard (FIG. 1, 112).

The component or components can be presented on a user interface, for instance, for a user to consume or view. For example, the dashboard (e.g., FIG. 1, 112) can communicate or present the component or components to the user via a user interface.

At 1016, it is determined whether the retrieved component meets the user's request, for example, whether the user is satisfied with the retrieved component. If it is determined that the retrieved component does not meet the user's request, the user can be allowed via the user interface to perform fine-tuning of the component at 1018. For example, via the user interface, the user may adjust the component shown on a dashboard. For instance, the user may use another or different sub-component or fragment to compose a model or dataset or another component.

At 1020, user's adjustment may be received as user feedback and is used to learn from the user feedback. Learned information is stored in the hybrid knowledge representation. For example, a hybrid knowledge base system learns from user feedback and stores the learned information in the hybrid knowledge representation.

A method in some embodiments may include receiving a search query. For example, a search query may be to search for a component in a machine learning engineering workflow (also referred to as a machine learning component) such as a machine learning model, a data set, metrics, and/or others. A method may also include searching a hybrid knowledge representation stored on a memory device for a machine learning component corresponding to the search query. In one embodiment, the hybrid knowledge representation includes nodes representing machine learning workflow components and edges (e.g., links) connecting the nodes based on relationships between the nodes. A hybrid knowledge representation can be structured as data elements with links. For example, a component can be linked to another component by a relationship. Examples of a structured representation may include, but are not limited to, a graph structure, a linked list, and/or another structure. In one aspect, a machine learning workflow component may include a network of nodes (e.g., data elements), for example, a node (e.g., data element) representing a sub-component of that machine learning workflow component. Such hybrid knowledge representation can be stored as structured data on a storage or memory device. A method may include, responsive to finding the machine learning component in the hybrid knowledge representation, returning the machine learning component. A method may include, responsive to not finding the machine learning component in the hybrid knowledge representation, searching the hybrid knowledge representation for machine learning model fragments associated with building the machine learning component, generating a new machine learning component by combining the machine learning model fragments and returning the new machine learning component. An example of a machine learning model fragment may include a subset of a dataset. Another example of a machine learning model fragment may include a sub-part of a machine learning model.

Figure 11:
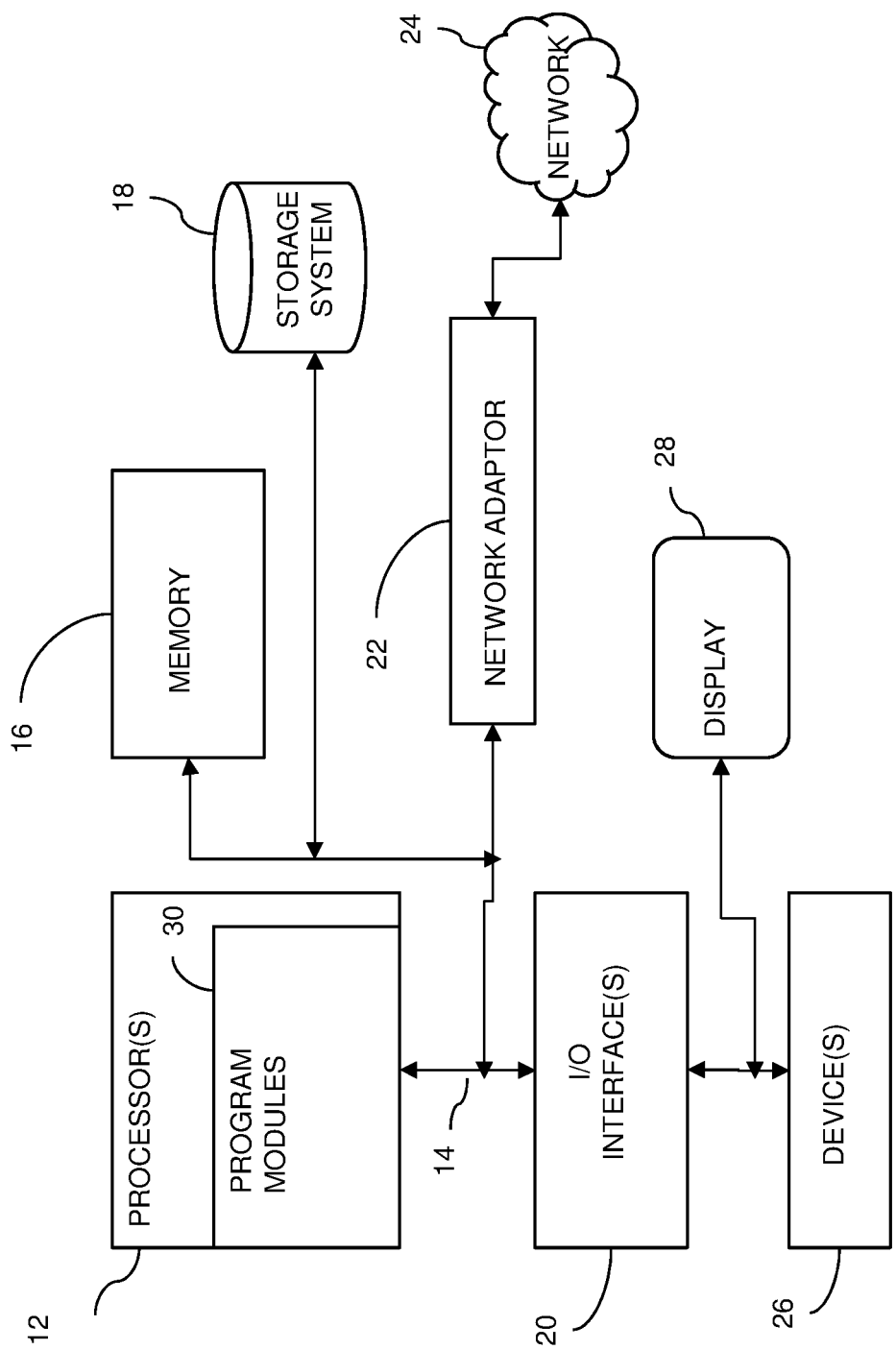
FIG. 11 illustrates a schematic of an example computer or processing system that may implement a system in one embodiment.

FIG. 11 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random-access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:

receiving a specification;

parsing the specification and identifying from the specification a machine learning task, wherein the specification includes at least characteristics about dataset, characteristics of model, and metric associated with machine learning for performing the machine learning task;

searching a hybrid knowledge representation stored in a memory device for a machine learning model that performs the machine learning task, the hybrid knowledge representation structured as nodes representing machine learning workflow components and edges connecting the nodes based on relationships between the nodes;

responsive to not finding in the hybrid knowledge representation the machine learning model to perform the machine learning task specified according to the specification including the characteristics about dataset, characteristics of model, and metric, searching the hybrid knowledge representation for machine learning model fragments associated with the machine learning task, the hybrid knowledge representation including at least components of a machine learning pipeline including at least datasets that can be split to provide a training set, validating set and testing set, and generating a new machine learning model to perform the machine learning task by combining the machine learning model fragments.

2. The computer-implemented method of claim 1, further comprising:

responsive to not finding the machine learning model in the hybrid knowledge representation, automatically generating a dataset for the new machine learning model.

3. The computer-implemented method of claim 1, wherein responsive to finding the machine learning model in the hybrid knowledge representation, outputting the machine learning model.

4. The computer-implemented method of claim 1, further comprising:

automatically generating metrics associated with executing the new machine learning model.

5. The computer-implemented method of claim 1, wherein the generating of the new machine learning model further comprises generating a semantic specification associated with the new machine learning model, the semantic specification comprising metadata annotating semantics of the new machine learning model.

6. The computer-implemented method of claim 1, further comprising outputting a machine learning model's workflow indicated by the hybrid knowledge representation's nodes and connecting edges associated with the machine learning model, responsive to finding the machine learning model in the hybrid knowledge representation.

7. The computer-implemented method of claim 1, further comprising outputting the new machine learning model's workflow indicated by the hybrid knowledge representation's nodes and connecting edges associated with the new machine learning model, responsive to not finding the machine learning model in the hybrid knowledge representation and responsive to generating the new machine learning model.

8. The computer-implemented method of claim 1, further comprising building the hybrid knowledge representation by structuring the machine learning workflow components into a database and creating metadata associated with the machine learning workflow components.

9. A system, comprising:

a hardware processor;

a memory device operatively coupled with the hardware processor, the memory device storing hybrid knowledge representation structured as nodes representing machine learning workflow components and edges connecting the nodes based on relationships between the nodes;

the hardware processor configured to at least:

receive a specification;

parse the specification and identify from the specification a machine learning task, wherein the specification includes at least characteristics about dataset, characteristics of model, and metric associated with machine learning for performing the machine learning task;

search the hybrid knowledge representation for a machine learning model that performs the machine learning task;

responsive to finding the machine learning model in the hybrid knowledge representation return the machine learning model;

responsive to not finding in the hybrid knowledge representation the machine learning model to perform the machine learning task specified according to the specification including the characteristics about dataset, characteristics of model, and metric, search the hybrid knowledge representation for machine learning model fragments associated with the machine learning task, the hybrid knowledge representation including at least components of a machine learning pipeline including at least datasets that can be split to provide a training set, validating set and testing set, and generate a new machine learning model to perform the machine learning task by combining the machine learning model fragments.

10. The system of claim 9, wherein the machine learning workflow components comprise machine learning network topology fragments representing an input layer fragment, an output layer fragment, a data transformation fragment, and a task-purpose fragment.

11. The system of claim 10, wherein the machine learning workflow components further comprise a data pre-processing component that generates at least one of a training dataset, a test dataset, and a validation dataset.

12. The system of claim 11, wherein the hardware processor is further configured to:

responsive to not finding the machine learning model in the hybrid knowledge representation, automatically generate a dataset for the new machine learning model based on the hybrid knowledge representation.

13. The system of claim 10, wherein the machine learning workflow components further comprise a metrics generation component that generates metrics associated with results produced by running at least one of: the machine learning model and the new machine learning model.

14. The system of claim 13, wherein the hardware processor is further configured to:

automatically generate metrics associated with executing one of the machine learning model and the new machine learning model based on the metrics generation component.

15. The system of claim 9, wherein the hardware processor is configured to generate a semantic specification associated with the new machine learning model responsive to generating the new machine learning model, the semantic specification indicating metadata annotating semantics of the new machine learning model.

16. The system of claim 9, wherein the hardware processor is further configured to output a machine learning model's workflow indicated by the hybrid knowledge representation's nodes and connected edges associated with the machine learning model, responsive to finding the machine learning model in the hybrid knowledge representation.

17. The system of claim 9, wherein the hardware processor is further configured to output the new machine learning model's workflow indicated by the hybrid knowledge representation's nodes and connected edges associated with the new machine learning model, responsive to not finding the machine learning model in the hybrid knowledge representation and responsive to generating the new machine learning model.

18. The system of claim 9, wherein the hardware processor is further configured to build the hybrid knowledge representation by structuring the machine learning workflow components into a database and creating metadata associated with the machine learning workflow components.

19. A computer program product comprising a non-transitory computer readable storage medium having program instructions embodied therewith, the program instructions executable by a device to cause the device to:

receive, by the device, a specification;

search, by the device, a hybrid knowledge representation stored on a memory device for a machine learning model corresponding to the specification, the hybrid knowledge representation structured as nodes representing machine learning workflow components and links connecting the nodes based on relationships between the nodes;

responsive to finding the machine learning component in the hybrid knowledge representation, return, by the device, the machine learning model;

responsive to not finding in the hybrid knowledge representation the machine learning model to perform a machine learning task specified according to the specification including characteristics about dataset, characteristics of model, and metric, search, by the device, the hybrid knowledge representation for machine learning model fragments associated with building the machine learning model, the hybrid knowledge representation including at least components of a machine learning pipeline including at least datasets that can be split to provide a training set, validating set and testing set, and generate, by the device, a new machine learning model by combining the machine learning model fragments and return the new machine learning model.

20. The computer program product of claim 19, wherein the machine learning model fragments comprise at least one of: a subset of the datasets and a sub-part of a machine learning model.

* * * * *